(12) United States Patent
Flaks et al.

(10) Patent No.: US 10,477,403 B2
(45) Date of Patent: *Nov. 12, 2019

(54) IDENTIFYING CALL CHARACTERISTICS TO DETECT FRAUDULENT CALL ACTIVITY AND TAKE CORRECTIVE ACTION WITHOUT USING RECORDING, TRANSCRIPTION OR CALLER ID

(71) Applicant: Marchex, Inc., Seattle, WA (US)

(72) Inventors: Jason Flaks, Redmond, WA (US); Ziad Ismail, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,339

(22) Filed: Oct. 22, 2018

(65) Prior Publication Data

US 2019/0200230 A1 Jun. 27, 2019

Related U.S. Application Data

(63) Continuation of application No. 14/550,089, filed on Nov. 21, 2014, now Pat. No. 10,111,102.

(51) Int. Cl.
*H04W 12/12* (2009.01)
*H04M 15/00* (2006.01)
(Continued)

(52) U.S. Cl.
CPC ......... *H04W 12/12* (2013.01); *H04L 63/0236* (2013.01); *H04M 3/436* (2013.01);
(Continued)

(58) Field of Classification Search
CPC ..... H04W 12/12; H04W 12/08; H04M 3/436; H04M 15/47; H04M 15/58;
(Continued)

(56) References Cited

U.S. PATENT DOCUMENTS

| | | | |
|---|---|---|---|
| 5,806,040 A * | 9/1998 | Vensko | G06Q 20/4014 704/233 |
| 2009/0094669 A1 * | 4/2009 | Savadi | H04L 63/1408 726/1 |

(Continued)

*Primary Examiner* — King Y Poon
*Assistant Examiner* — Vincent Peren
(74) *Attorney, Agent, or Firm* — Perkins Coie LLP

(57) ABSTRACT

A system and method for monitoring telephone calls to detect fraudulent activity and take corrective action is described. The system receives a group of telephone calls having associated call characteristics and analyzes the group of telephone calls to identify and store a first set of distributions of call characteristics that are indicative of normal activity, fraudulent activity, or indeterminate activity. The system receives one or more subsequent telephone calls to be analyzed. The system analyzes the received one or more telephone calls to identify a second set of distributions of call characteristics associated with the received telephone call. The system then compares the second set of distributions of call characteristics to the stored first set of distributions of call characteristics to assess a probability that the one or more received telephone calls represents normal, fraudulent, or indeterminate activity. If the assessed probability of fraudulent activity exceeds a threshold, the system takes appropriate corrective action, such a flagging the fraudulent call or withholding a financial incentive associated with the fraudulent call.

38 Claims, 6 Drawing Sheets

(51) Int. Cl.
    *H04M 3/436*  (2006.01)
    *H04L 29/06*  (2006.01)
    *H04W 12/08*  (2009.01)

(52) U.S. Cl.
    CPC .......... *H04M 15/47* (2013.01); *H04M 15/58*
        (2013.01); *H04M 15/8083* (2013.01); *H04L
        63/1425* (2013.01); *H04M 2201/18* (2013.01);
            *H04M 2203/556* (2013.01); *H04W 12/08*
                                            (2013.01)

(58) Field of Classification Search
    CPC ......... H04M 15/8083; H04M 2201/18; H04M
            2203/556; H04L 63/0236; H04L 63/1425
    USPC ...................................... 379/114.41; 455/406
    See application file for complete search history.

(56) References Cited

U.S. PATENT DOCUMENTS

2012/0263285 A1* 10/2012 Rajakumar ............. G10L 17/00
                                                        379/189
2015/0249737 A1*  9/2015 Spievak ................ H04M 3/436
                                                        379/189

\* cited by examiner

| Identifier | Advertiser | Distribution Channel | Call Characteristic(s) |
|---|---|---|---|
| 1 | Acme Bank | billboard_417 | new business |
| 2 | City Hospital | www2.sports555.com | hang-up |
| 3 | Main Street Cleaners | Freeman Times Newspaper | general inquiry; non-product or service |

FIG. 4

IDENTIFYING CALL CHARACTERISTICS TO DETECT FRAUDULENT CALL ACTIVITY AND TAKE CORRECTIVE ACTION WITHOUT USING RECORDING, TRANSCRIPTION OR CALLER ID

CROSS-REFERENCE TO RELATED APPLICATION(S)

This application is a continuation of U.S. patent application Ser. No. 14/550,089 entitled "IDENTIFYING CALL CHARACTERISTICS TO DETECT FRAUDULENT CALL ACTIVITY AND TAKE CORRECTIVE ACTION WITHOUT USING RECORDING, TRANSCRIPTION OR CALLER ID," filed on Nov. 21, 2014, the disclosure of which is incorporated herein by reference in its entirety

BACKGROUND

Many advertisers are uncertain of the value of computer-based click advertising, but are more certain of the value of a telephone call from a prospective customer. The recognition of call value has given rise to various advertising programs that focus on delivering telephone calls to advertisers. Industry analysts have estimated that in 2013 more than $60 Billion was spent on advertising in the United States to persuade consumers to call a business. As opposed to click advertising, where the payout per click can be measured in cents or fraction of a cent, call based advertising pays orders of magnitudes more for quality calls. Unfortunately, such financial rewards have given rise to new forms of call spam and fraud.

Traditionally, spam blocking has been dependent on the people committing fraud retaining the same caller ID across multiple calls. That means that once a pattern has been identified either by a person or machine, the identified caller ID could be placed on a blacklist to prevent future calls. There are for example many sites on the Internet that list suspicious calls by caller ID. However, it has become increasingly easy for parties seeking to commit fraud to buy and use temporary phone numbers or to simply fake caller ID before making a call in order to circumvent fraud-prevention technologies based on caller ID.

There is therefore the need for a better method of spam and fraud detection that is not dependent on caller ID.

BRIEF DESCRIPTION OF THE DRAWINGS

FIG. 4 is a table illustrating a group of telephone calls that is received by the fraud detection system for use in generating one or more sets of distributions of call characteristics that are indicative of normal activity, fraudulent activity, or indeterminate activity.

DETAILED DESCRIPTION

Figure 1:
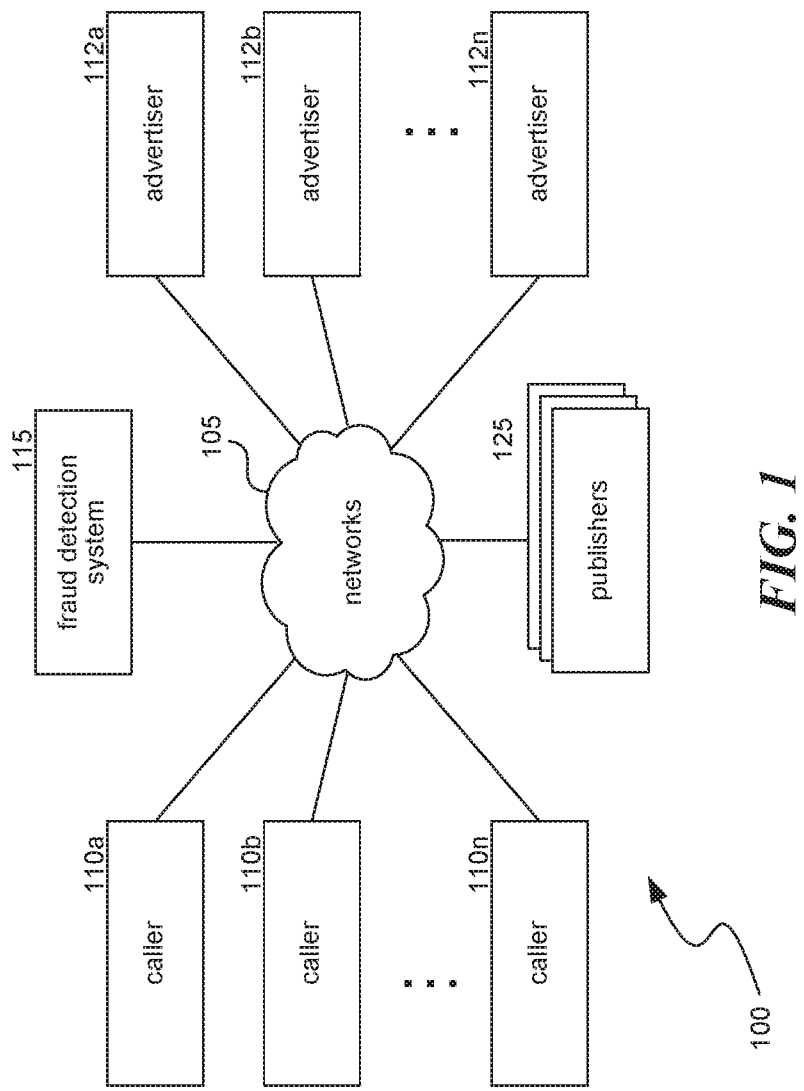
FIG. 1 is a block diagram illustrating an environment in which a fraud detection system operates in some embodiments.

A system and method that monitors one or more telephone calls to detect fraudulent activity and take corrective action is disclosed. The system analyzes a group of telephone calls to identify distributions of call characteristics that are indicative of one or more levels of fraud, and then applies the identified distributions of call characteristics to one or more subsequent telephone calls to detect fraudulent activity in the one or more subsequent telephone calls. The analysis of the one or more subsequent telephone calls excludes the use of caller ID and excludes the analysis of a recording or transcription of the one or more subsequent telephone calls. By avoiding call recording or transcription of the one or more subsequent telephone calls, the system advantageously avoids many general privacy concerns of the public that may otherwise arise when recording or transcribing certain personal information such as Social Security Numbers, credit card numbers, bank account numbers, passport numbers, physical street addresses, Protected Health Information (PHI), or other Personally Identifiable Information (PII). Additional information regarding these concerns, as well as other advantages of analyzing one or more subsequent telephone calls without recording or transcription, is described in U.S. patent application Ser. No. 14/045,118, entitled "SYSTEM AND METHOD FOR ANALYZING AND CLASSIFYING CALLS WITHOUT TRANSCRIPTION VIA KEYWORD SPOTTING," filed on Oct. 3, 2013, and is incorporated herein by reference in its entirety. When the fraud detection system identifies a call as being fraudulent, the system takes corrective action with respect to the identified fraud, as described in more detail below. As used herein, the term "telephone call," "phone call," or "call" refers to any voice communication placed or received via a telecommunications network (e.g., Public Switched Telephone Network (PSTN), other wireline network, or wireless network) or Internet Protocol-based communication network (e.g., Voice over Internet Protocol (VoIP)).

The fraud detection system analyzes a group of telephone calls having associated call characteristics and known levels of fraudulent activity associated with each call. The system may perform the analysis on a per-advertiser or per-distribution channel basis, or the system may perform the analysis on a group of calls associated with multiple advertisers or distribution channels. The system applies one or more statistical processing techniques to the telephone calls in order to identify a first set of distributions of call characteristics that correlate to one or more levels of likely fraud. For example, the system may use scoring functions or machine learning algorithms including, but not limited to, logistic regression, support vector machines, or neural networks to identify distributions of call characteristics that correlate to one or more levels of likely fraud. Call characteristics may include the length of the call, patterns of interactions between the caller and the called party, time of the call, or other parameters that characterize the call, as described in more detail below. In some embodiments, the system determines the sets of distributions call characteristics that are indicative of one or more levels of likely fraud by using a probabilistic model such as a Bayesian model, hidden Markov model, or a Gaussian mixture model.

In particular, the system may analyze the information in the group of calls to identify a first set of distributions of call characteristics that are indicative of normal activity (i.e., activity that is not typically indicative of fraud), to identify a first set of distributions of call characteristics that are indicative of fraudulent activity (i.e., activity that is likely indicative of fraud), or to identify a first set of distributions of call characteristics that are indicative of indeterminate activity (i.e., activity that is neither indicative of normal activity or fraudulent activity). The system then stores the first set of distributions of call characteristics along with additional characterizing information (e.g., associated advertiser or distribution channel) that enables the system to correlate future telephone calls to one or more levels of fraudulent activity and take appropriate corrective action.

After storing first set of distributions of call characteristics along with additional characterizing information derived from the group of telephone calls, the system receives one or more subsequent telephone calls to be analyzed for potential fraudulent activity. The system analyzes the one or more received telephone calls to identify a second set of distributions of call characteristics associated with the one or more received telephone calls. The system compares the first set of distributions of call characteristics and additional characterizing information from the group of calls to the second set of distributions of call characteristics associated with the one or more received telephone calls. Based on the comparison, the system identifies whether the one or more received telephone calls is indicative of normal activity, fraudulent activity, or indeterminate activity. The system calculates a probability that represents the extent to which the one or more received telephone calls is indicative of a particular level of fraudulent activity. For example, the system may calculate a probability in the range of 0.1 to 1.0 for a particular received call that is indicative of normal activity, with the confidence level that the call reflects normal activity increasing as the value approaches 1. Similarly, the system may calculate a probability in the range of 0.1 to 1.0 for a call that is indicative of fraudulent activity, with the confidence level that the call reflects fraudulent activity increasing as the value approaches 1. Similarly, the system may calculate a probability for a call that indicates neither normal activity nor fraudulent activity (i.e., an indeterminate call). The system may express a calculated probability as a percentage, positive number, negative number, fraction, or any number falling on any various additional numerical scales.

The system may take corrective measures based on the identified level of fraud. For example, if the system identifies that one or more received telephone calls is indicative of fraudulent activity, the system may withhold a financial incentive from the responsible entity or blacklist telephone calls from the responsible entity. Additionally or alternatively, the system may identify a distribution channel (e.g., a particular advertised telephone number) associated with a fraudulent telephone call and take any number of actions with respect to the applicable distribution channel, including flagging the distribution channel for heightened monitoring or disabling call activity on the distribution channel. Additional details regarding corrective actions is described below.

FIG. 1 is a block diagram illustrating a representative environment 100 in which a fraud detection system 115 operates. Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the system described herein may be stored or distributed on tangible, non-transitory computer-readable media, including magnetic and optically readable and removable computer discs, stored in firmware in chips (e.g., EEPROM chips). Alternatively, aspects of the system may be distributed electronically over the Internet or over other networks (including wireless networks). Those skilled in the relevant art will recognize that portions of the system may reside on a server computer, while corresponding portions reside on a client computer.

Referring to the example of FIG. 1, the fraud detection system 115 is communicably coupled to one or more callers 110 (shown individually as callers 110a-110n) via one or more networks 105. The fraud detection system 115 is also communicably coupled to one or more advertisers 112 (shown individually as advertisers 112a-112n) via the networks 105. A caller 110 may be an individual person, a business, a governmental agency, or any other entity capable of initiating telephone calls for any reason, including calls initiated in response to advertisements for products or services. An advertiser 112 similarly may be an individual person, a business, a governmental agency, or any other entity capable of receiving telephone calls in response to advertisements that are placed by the advertiser. The fraud detection system 115 is capable of monitoring when telephone calls are made from the callers 110 to the advertisers 112, and may process such calls (i.e., "received calls") to determine an associated level of fraudulent activity and take corrective action if necessary. Networks 105 are any network suitable for communicably coupling the callers 110, the advertisers 112 and the fraud detection system 115, such as a Voice over Internet Protocol (VoIP) network, a cellular telecommunications network, a public-switched telephone network (PSTN), any combination of these networks, or any other suitable network that can carry data and/or voice telecommunications.

The callers 110, advertisers 112 and fraud detection system 115 may also communicate with each other and with publishers 125 via public or private networks 105, including for example, the Internet. The fraud detection system 115 may provide an interface such as a website that allows system users to access the fraud detection system 115, and which provides data regarding the fraud detection services and functions. The publishers 125 provide content which displays or uses call tracking phone numbers provided from a call tracking system (not shown) to enable callers to call advertisers. More information regarding call tracking systems may be found in U.S. patent application Ser. No. 12/829,375, entitled "SYSTEM AND METHOD TO ANALYZE CALLS TO ADVERTISED TELEPHONE NUMBERS," filed on Jul. 1, 2010, which is incorporated herein by reference in its entirety.

The callers 110 and advertisers 112 may have mobile devices and computers that are utilized for communicating with each other and with the publishers 125 through the network 105. Any mobile devices may communicate wirelessly with a base station or access point using a wireless mobile telephone standard, such as the Global System for Mobile Communications (GSM), Long Term Evolution (LTE), or another wireless standard, such as IEEE 802.11, and the base station or access point may communicate with the fraud detection system 115 and publishers 125 via the network 105. Computers may communicate through the network 105 using, for example, TCP/IP protocols.

Figure 2:
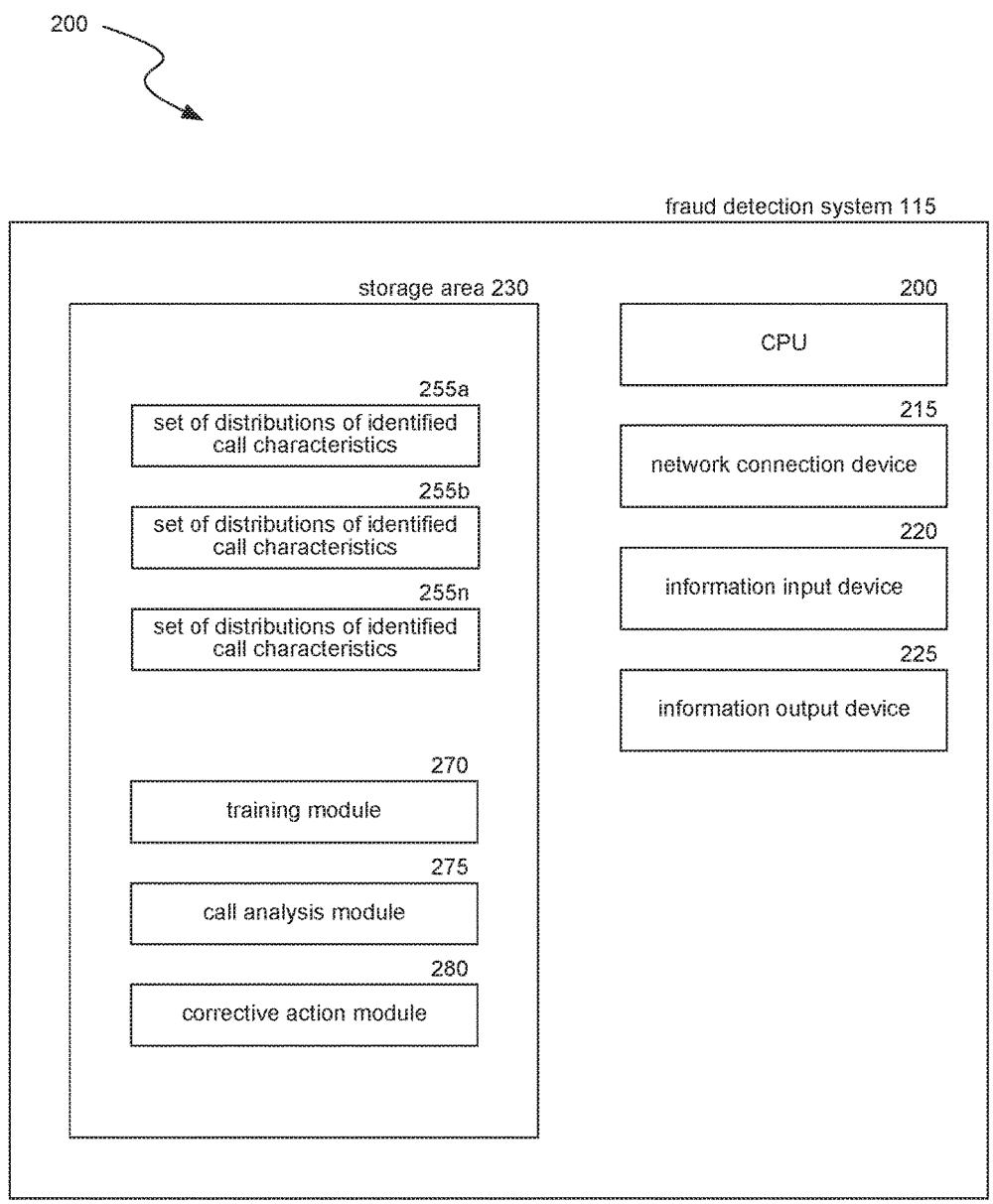
FIG. 2 is a block diagram illustrating the fraud detection system in more detail.

FIG. 2 is a block diagram illustrating the fraud detection system 115 in more detail. The fraud detection system 115 includes a storage area 230. The storage area 230 includes software modules and data that, when executed or operated on by a processor, perform certain of the methods or functions described herein. The storage area may include components, subcomponents, or other logical entities that assist with or enable the performance of some or all of these methods or functions. For example, the modules may in some embodiments be utilized to implement a training module 270 to identify sets of distributions of call characteristics for a given group of known telephone calls and received telephone calls; a call analysis module 275 to analyze a received call to identify sets of distributions of call characteristics that are associated with the received call and determine a probability of whether the received call corresponds to normal, fraudulent, or indeterminate activity; and a corrective action module 280 to determine whether a determined probability of fraud exceeds a threshold, and if so, to take appropriate corrective action. Training module 270, call analysis module 275, and corrective action module 280 will each be described in more detail with respect to FIGS. 3-6.

The stored data include one or more sets of distributions of call characteristics 255a-255n that correspond to groups of telephone calls having known levels of fraudulent activity, as well as to one or more received telephone calls that are to be analyzed for fraudulent call activity. Additional information regarding the one or more sets of stored distributions of call characteristics 255a-255n is described in more detail with respect to FIGS. 3-6. A person of ordinary skill will appreciate that storage area 230 may be volatile memory, non-volatile memory, a persistent storage device (for example, an optical drive, a magnetic hard drive, a tape of a tape library, etc.), or any combination thereof.

The fraud detection system 115 further includes one or more central processing units (CPU) 200 for executing software stored in the storage area 230, and a computer-readable media drive for reading information or installing software from tangible computer-readable storage media, such as a floppy disk, a CD-ROM, a DVD, a USB flash drive, and/or other tangible computer-readable storage media. The fraud detection system 115 also includes one or more of the following: a network connection device 215 for connecting to a network, an information input device 220 (for example, a mouse, a keyboard, etc.), and an information output device 225 (for example, a display).

Figure 3:
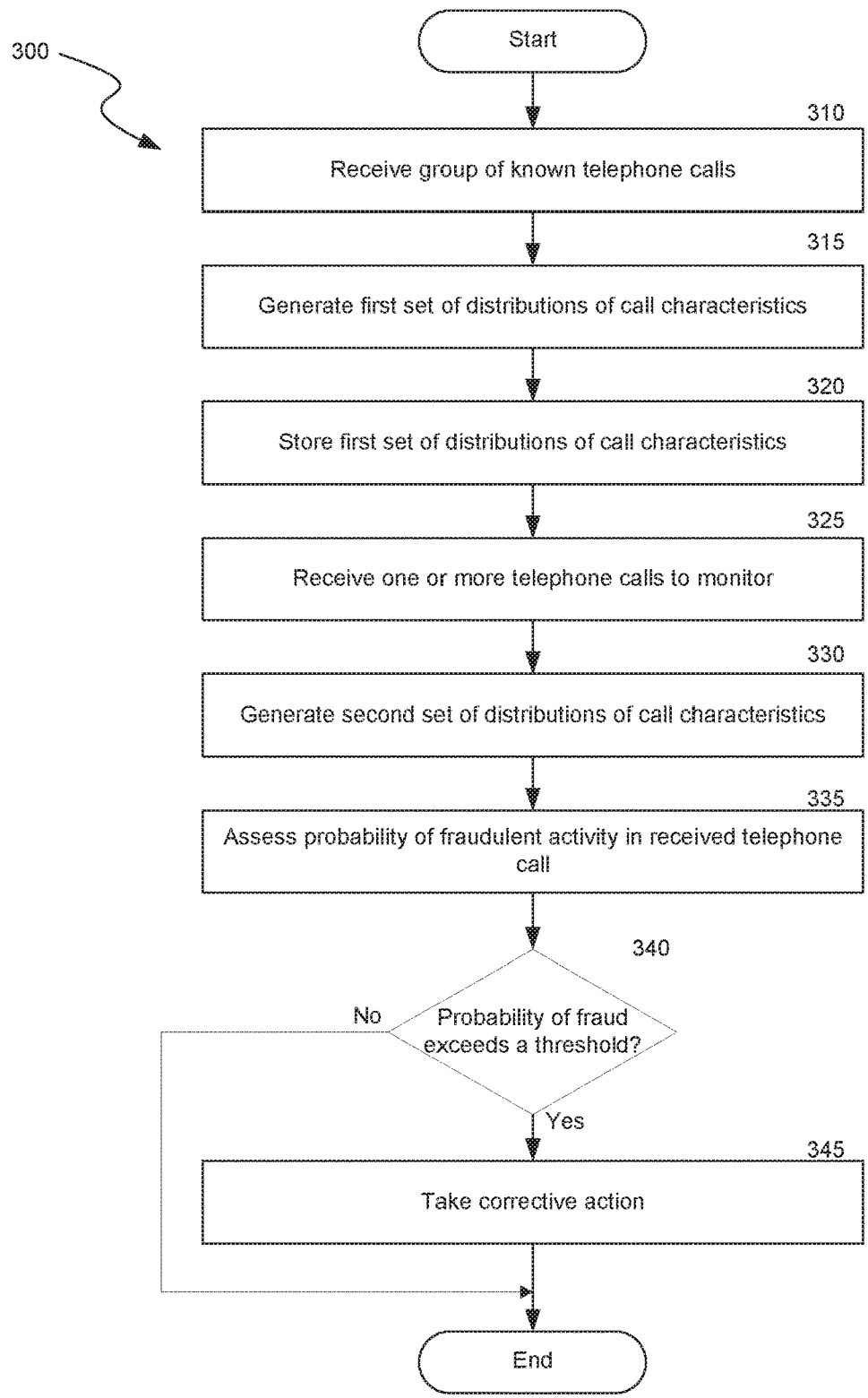
FIG. 3 is a flowchart showing a method implemented by the fraud detection system to detect fraudulent call activity and take corrective action with respect to a monitored call without using recording, transcription or caller ID in connection with the monitored call.

FIG. 3 is a flowchart showing a method implemented by fraud detection system 115 to detect fraudulent call activity of one or more monitored telephone calls and take corrective action without using recording, transcription or caller ID. In steps 310-320, the system executes a training function to generate a first set of distributions of call characteristics that are indicative of one or more levels of fraud activity—such as normal activity, fraudulent activity, or indeterminate activity—that is associated with a group of known telephone calls. At step 310, the system receives a group of telephone calls that correspond to a known level of fraudulent activity. In addition, the system receives corresponding information for individual telephone calls within the known group of telephone calls, for example including an identification of an associated advertiser (i.e., an advertiser who placed or received the telephone call), an identification of an associated distribution channel (e.g., a website, online advertisement, search engine result, billboard advertisement, print advertisement, radio or television advertisement, etc.), or an identification of one or more associated call characteristics. Call characteristics may include information that categorizes the telephone call into a particular group, including but not limited to, no conversation, fax, robocall, technical error, voicemail hang-up, phone tree hang-up, voicemail message, misclassified call, no connection, non-product or service, wrong number, unclear intent, miscellaneous call, strange, weird, new business, follow-up required, sale, general inquiry, inquiry regarding services not offered, inquiry regarding hours, inquiry regarding directions, or inquiry regarding inventory.

A person of ordinary skill will appreciate that any number of additional call characteristics may be included. For example, an attempt by a caller to lengthen an amount of time that the caller interacts with an Integrated Voice Response (IVR) system may constitute a call characteristic. In addition, a call characteristic can be the presence of a distortion of a voice pattern in a telephone call, including distortion caused by a human or distortion caused by a machine. Additional details regarding the group of telephone calls received by the system is described with respect to FIG. 4. Additional information regarding call characteristics is described in U.S. patent application Ser. No. 13/842,769, entitled "SYSTEM AND METHOD FOR ANALYZING AND CLASSIFYING CALLS WITHOUT TRANSCRIPTION," filed on Mar. 15, 2013, which is incorporated herein by reference in its entirety.

At step 315 the system analyzes the received group of telephone calls to generate a first set of distributions of call characteristics that is indicative of one or more levels of fraud activity, such as normal activity, fraudulent activity, or indeterminate activity. Calls in the received group of telephone calls may have multiple audio channels, for example an audio channel associated with an associated caller and an audio channel associated with an associated call recipient. The received group of telephone calls may correspond to a single advertiser or may correspond to multiple advertisers. Likewise, the received group of telephone calls may correspond to a single distribution channel or to multiple distribution channels. Additional details regarding the generation of the first set of distributions of call characteristics is described with respect to FIG. 5.

At step 320, the fraud detection system stores the generated first set of distributions of call characteristics for subsequent use in analyzing one or more received telephone calls. Additional details regarding the first set of distributions of call characteristics is described with respect to FIG. 6. At step 325, the system receives a telephone call to be analyzed for fraudulent activity. The received telephone calls may have multiple audio channels, for example an audio channel associated with an associated caller and an audio channel associated with an associated call recipient. The one or more received telephone calls are typically initiated in response to viewing or hearing an associated telephone number in an advertisement via a distribution channel. The one or more telephone calls are typically received by a business (e.g., by a person who works for the business or by an Interactive Voice Response (IVR) system of the business) that is responsible for the advertisement. The system analyzes the received one or more telephone calls to identify a second set of distributions of call characteristics associated with the one or more received calls (step 330) and assesses a probability that the one or more received calls are associated with fraudulent activity (step 335). As explained in more detail with respect to FIG. 6, the fraud detection system compares the second set of distributions of call characteristics (associated with the received call) to the first set of distributions of call characteristics (associated with the known group of calls) to identify the probability of fraudulent, normal, or indeterminate activity associated with the one or more received calls. The comparison may be performed on a per-advertiser basis or a per-distribution channel basis, thereby allowing for greater flexibility in tailoring the fraud detection to suit the specific needs of one or more advertisers.

At step 340, the fraud detection system determines whether the determined probability of fraud exceeds a threshold. The threshold may be set by a user or a system operator and may be used as a trigger to cause the system to take corrective action to remedy any detected fraud. For example, if the system detects that a telephone call has a probability of fraudulent activity that meets or exceeds the threshold, the system may proceed to step 345 to take corrective action by flagging the distribution channel associated with the call for heightened monitoring or disabling call activity on the distribution channel. As another example, the fraud detection system may withhold a financial incentive from a party associated with the telephone call, withhold a financial incentive from a party associated with generating telephone calls via an associated distribution channel, blacklist a caller who initiated the telephone call (i.e., prevent future calls from the caller from being routed to the advertiser), log the occurrence of the call (including one or more of the calculated threshold, associated call characteristics, associated advertiser, associated distribution channel, time of call, duration of call, or other associated information) to non-volatile memory, or provide a notice to a system operator. In the case of providing a notice to the system operator, the notice may include the determined probability of fraud. As yet another example, the fraud detection system may take corrective action by not charging the advertiser for activity associated with the fraudulent call in the event that the probability of fraud exceeds a threshold. If the fraud detection system detects that the probability of fraud does not exceed a specified threshold at step 345, the system may decline to take corrective action.

FIG. 4 is a table illustrating a group of known telephone calls that is received by the fraud detection system for use in generating a first set of distributions of call characteristics that are indicative of normal activity, fraudulent activity, or indeterminate activity. Table 400 contains four columns corresponding to various information that may be received for each telephone call in the known group of telephone calls: column 410, labeled "Identifier," which assigns a unique number or code to each telephone call within the known group of telephone calls; column 415, labeled "Advertiser," which identifies the advertiser that placed or received each telephone call; column 420, labeled "Distribution Channel," which identifies the distribution channel associated with each telephone call; and column 425, labeled "Call Characteristic(s)," which identifies one or more call characteristics that are associated with each telephone call.

Table 400 illustrates a group of telephone calls containing three telephone calls. Row 450 corresponds to a telephone call that was received by Acme Bank in response to a telephone number that was advertised on a billboard (identified by "billboard_417"), and that resulted in new business for the bank. Row 455 corresponds to an IP-based telephone call that was received by City Hospital after being initiated by a caller who clicked an advertisement on the www2.sports555.com website and then prematurely disconnected the telephone call. Row 460 corresponds to a telephone call that was receive by Main Street Cleaners in response to a print advertisement that appeared in the Freeman Times newspaper, the call regarding a general inquiry that related to product or service that was not offered by Main Street Cleaners. Although Table 400 depicts four columns of information, a person of ordinary skill in the art will appreciate that Table 400 may contain columns of information in addition to those shown (including, for example, the telephone number that was dialed, the context in which the telephone number was dialed, the date or time of day that the telephone number was dialed, the duration of the telephone call, etc.). A person of ordinary skill further will appreciate that Table 400 may omit certain information for a particular telephone call while including other information for the call (e.g., Table 400 may include advertiser information but omit distribution information for a first telephone call, or may include distribution information but omit advertiser information for a second telephone call). Although Table 400 depicts a single entry (i.e., row) for a telephone call having multiple call characteristics, a person of ordinary skill will appreciate that such a telephone call having multiple call characteristics may be represented by multiple entries in Table 400 (i.e., one entry for each associated call characteristic). In addition, although Table 400 contains telephone calls corresponding to multiple advertisers and multiple distribution channels, a person of ordinary skill will appreciate that separate tables may be compiled on a per-advertiser or per-distribution channel basis.

Figure 5A:
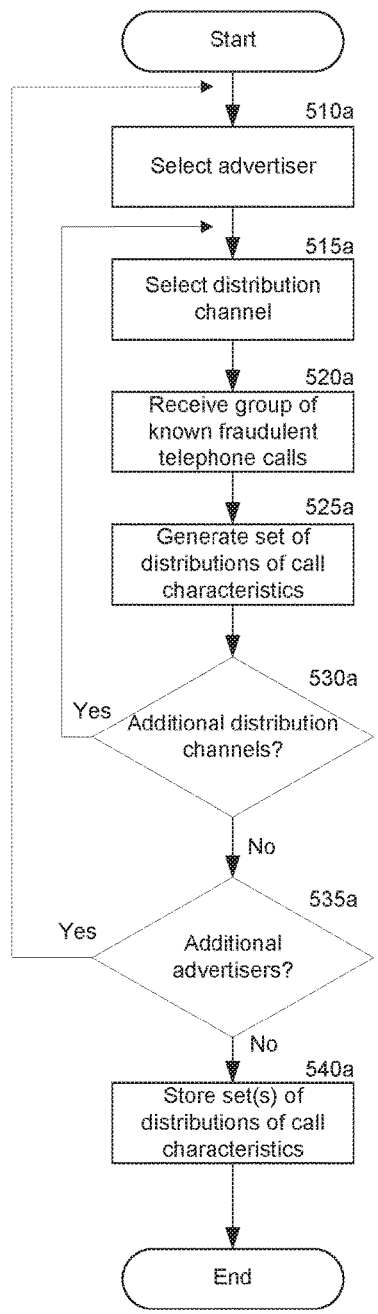
FIGS. 5A-5B are flowcharts showing a method implemented by the fraud detection system for analyzing two different groups of telephone calls to generate sets of distributions of call characteristics that are indicative of normal activity, fraudulent activity, or indeterminate activity.

FIG. 5A is a flowchart showing a method implemented by the fraud detection system for analyzing a group of known telephone calls to generate a first set of distributions of call characteristics that are indicative of normal activity, fraudulent activity, or indeterminate activity. At step 510a, the system selects an advertiser that is associated with a group of telephone calls that is to be analyzed. An advertiser may correspond to an individual company or entity, such as a corporation, bank, hospital, school, coffee shop, or a particular department or subgroup thereof (e.g., a selected advertiser may be a credit department or an investment services department within the same bank). At step 515a, the system selects a distribution channel that is associated with the group of telephone calls that is to be analyzed. A distribution channel may correspond to any physical or electronic medium through which a given telephone number is advertised. For example, a distribution channel may correspond to a banner advertisement that displays a telephone number on a website, a radio or television advertisement that displays or announces a telephone number, or a physical billboard advertisement that displays the telephone number.

At step 520a, the fraud detection system receives a group of telephone calls to be analyzed. In the embodiment of FIG. 5A, the system receives a group of telephone calls that is known to be associated with fraudulent activity. At step 525a, the system applies statistical processing (e.g., scoring functions, machine learning algorithms including, but not limited to, logistic regression, support vector machines, or neural networks) to the group of telephone calls in order to generate a set of distributions of call characteristics that are indicative of fraudulent activity. More information regarding the distributions of call characteristics is further described with respect to FIG. 6.

At step 530a, the system determines whether the analysis should be repeated to create additional sets of distributions of call characteristics with respect to one or more additional distribution channels. If an analysis is desired for one or more additional distribution channels, the system returns to step 515a to repeat the analysis. If no additional distribution channels remain to be analyzed, the system proceeds to step 535a to determine whether an analysis is desired to create additional sets of distributions of call characteristics for one or more additional advertisers. If an analysis is desired for one or more additional advertisers, the system returns to step 510a to repeat the analysis. If no additional advertisers remain to be analyzed, the system proceeds to step 540a to store the sets of distributions of call characteristics that have been generated for subsequent use in analyzing one or more received telephone calls. Although the steps of FIG. 5A are shown in a particular order, a person of ordinary skill will appreciate that certain steps of FIG. 5A may be performed in a different order than shown. For example, the fraud detection system may select a distribution channel before selecting an advertiser. The fraud detection system may store each respective set of distributions of call characteristics as each is generated (rather than waiting until multiple sets of distributions of call characteristics are generated for different advertisers or distribution channels). A person of ordinary skill also will appreciate that, in some embodiments, the fraud detection system may generate sets of distributions of call characteristics without respect to a particular distribution channel or advertiser.

Figure 5B:
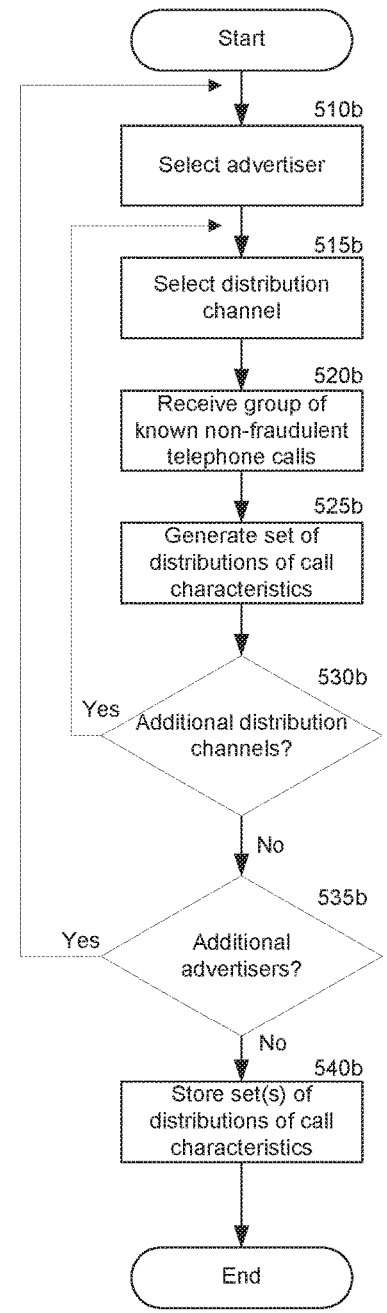

FIG. 5B is substantially similar to FIG. 5A, the primary difference being that at step 520b, the fraud detection system receives a group of telephone calls for analysis that are known to be associated with non-fraudulent activity. At step 525b, the system applies statistical processing (e.g., scoring functions, machine learning algorithms including, but not limited to, logistic regression, support vector machines, or neural networks) to the group of telephone calls in order to generate a set of distributions of call characteristics that are indicative of non-fraudulent activity. At step 535b, the system stores the generated set(s) of distribution of call characteristics for non-fraudulent call activity for subsequent use in analyzing one or more received telephone calls.

A person of ordinary skill will appreciate that the system may perform the analysis described in FIGS. 5A and 5B with respect to additional types of known groups of telephone calls, including groups of telephone calls that are known to be neither fraudulent nor non-fraudulent (i.e., indeterminate calls). Although FIGS. 5A and 5B and their corresponding descriptions depict a separate analysis of fraudulent calls, non-fraudulent calls, and indeterminate calls, a person of ordinary skill will appreciate that in some embodiments the fraud detection system may derive sets of distributions of call characteristics for indeterminate calls by identifying sets of distributions of call characteristics that are not present for either fraudulent calls (e.g., FIG. 5A) or normal calls (e.g., FIG. 5B).

Figure 6:
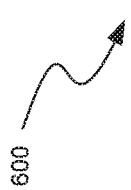
FIG. 6 is a table illustrating a generated set of call characteristics that are indicative of normal activity, fraudulent activity, and/or indeterminate activity.

FIG. 6 is a table illustrating a generated set of call characteristics that are indicative of a given level of fraudulent activity. Table 600 includes rows 650a-650n, where each row represents a particular distribution of call characteristics for which a corresponding probability of fraudulent, normal, or indeterminate call activity is likely. Table 600 contains columns corresponding to a particular distribution of call characteristics (605); an associated advertiser (610); an associated distribution channel (615); and an associated probability of normal activity (620), fraudulent activity (625), and indeterminate activity (630) for the given distribution of call characteristics. For example, entry 650a indicates that a call having a distribution of call characteristics corresponding to "general inquiry" and "sale," for any advertiser, on distribution channel "billboard_1" has a 75% probability of being a normal (i.e., non-fraudulent) call, a 20% probability of being a fraudulent call, and a 5% chance of being an indeterminate call. Entry 650b indicates that a call having a distribution of call characteristics corresponding to "sale" and "non-product or service," for Acme Bank, on any distribution channel has a 15% probability of being a normal call, a 50% probability of being a fraudulent call, and a 35% chance of being an indeterminate call. Entry 650n indicates that a call having a distribution of call characteristics corresponding to "hangup," "general inquiry," and "technical error," for City Hospital, on distribution channel "web_ad_2" has a 55% probability of being a normal call, a 45% probability of being a fraudulent call, and a zero percent probability of being an indeterminate call.

A person of ordinary skill in the art will appreciate that, for any given entry, column 605 may contain a distribution that may contain any number of call characteristics. Likewise, a person of ordinary skill will appreciate that Table 600 may contain any number of entries corresponding to different distributions of call characteristics. In addition, a person of ordinary skill will appreciate that the probabilities of normal, fraudulent, and indeterminate activity may be represented on any numeric scale, including, for example, numerical percentages, or positive numbers to indicate a likely probability for a particular level of fraud and negative numbers to indicate an unlikely probability for a particular level of fraud.

The fraud detection system may use information stored in Table 600 to determine whether a received call is likely normal, fraudulent, or indeterminate, and take any necessary corrective action. By matching information associated with the received call to information stored in conjunction with one or more sets of distributions of call characteristics, the fraud detection system is able to identify the probability of fraudulent, normal, or indeterminate activity associated with the received call. For example, the fraud detection system may receive a phone call that was placed to Acme Bank after the telephone number was broadcast via distribution channel "radio_ad_17." After analyzing the call, the system may determine that the received phone call contains call characteristics corresponding to "sale" and "non product or service." The fraud detection system then searches the stored sets of distributions of call characteristics in Table 600. Because entry 650*b* corresponds to advertiser "Acme Bank" and the call characteristics correspond to "sale" and "non-product or service," the fraud detection system identifies entry 650*b* as a match for the received call. Note that, in the current example, entry 650*b* corresponds to any advertiser, an therefore the system matches the received call to entry 650*b* regardless of the actual advertiser that is associated with the received call. Because the received call matches 650*b*, the system identifies the corresponding probabilities: 15% probability of normal activity; 50% A probability of fraudulent activity; and 35% probability of indeterminate activity.

As explained with respect to FIG. 3, the fraud detection system may take corrective action if the probability of fraud meets or exceeds a specified threshold. If, for example, a user or system operator set a threshold of a 75% probability of fraud for taking corrective action, no corrective action would be taken in the present example because the actual probability of fraud for the received call is only 50%. If, on the other hand, the user or system operator set a threshold of a 50% probability of fraud for taking corrective action, then the system would take one or more corrective actions because the actual probability of fraud for the received call meets the threshold value of 50%.

From the foregoing, it will be appreciated that specific embodiments of the invention have been described herein for purposes of illustration, but that various modifications may be made without deviating from the scope of the invention. Those skilled in the art will appreciate that the operations and routines depicted in flowchart blocks and otherwise described herein may be altered in a variety of ways. More specifically, the order of the steps may be re-arranged, steps may be performed in parallel, steps may be omitted, other steps may be included, various combinations or omissions of routines may be made, etc. Accordingly, the invention is not limited except as by the appended claims.

We claim:

1. A method for monitoring telephone calls to detect fraudulent activity and take corrective action, the method implemented at least in part using a computer system comprising one or more processors and computer-readable storage media storing instructions, the method comprising:
   receiving a first telephone call placed to a first published telephone number, wherein the first published telephone number is published via a distribution channel, and wherein a plurality of published telephone numbers that includes the first telephone number has been published via the distribution channel;
   analyzing the first telephone call to identify a first set of distributions of call characteristics associated with the first telephone call;
   assessing a probability that the first telephone call represents normal activity or fraudulent activity, wherein the assessing comprises comparing the first set of distributions of call characteristics to a second set of distributions of call characteristics identified by analyzing a group of telephone calls, and wherein the second set of distributions of call characteristics are indicative of normal activity or fraudulent activity; and
   executing a corrective action in response to determining that the probability that the first telephone call represents fraudulent activity exceeds a threshold,
   wherein the corrective action is executed with respect to the distribution channel such that (a) the first telephone call and (b) a subsequently received second telephone call to a second published telephone number in the plurality of published telephone numbers are subject to the corrective action.

2. The method of claim 1, wherein analyzing the first telephone call to identify the first set of distributions of call characteristics associated with the first telephone call includes analyzing a pattern of interaction between a caller and a call recipient of the first telephone call.

3. The method of claim 1, wherein analyzing the first telephone call to identify the first set of distributions of call characteristics associated with the first telephone call is performed without using recording, transcription, or caller identification in connection with the analysis of the first telephone call.

4. The method of claim 1, wherein:
   the group of telephone calls is a first group of telephone calls;
   the method further comprises assessing a probability that the first telephone call represents indeterminate activity;
   the assessing comprises comparing the first set of distributions of call characteristics to a third set of distributions of call characteristics identified by analyzing a second group of telephone calls; and
   the third set of distributions of call characteristics are indicative of indeterminate activity.

5. The method of claim 1, wherein the corrective action is flagging the distribution channel for heightened monitoring.

6. The method of claim 1, wherein the corrective action is disabling call activity on the distribution channel.

7. The method of claim 1, wherein the corrective action is withholding a financial incentive from a party associated with generating telephone calls via the distribution channel.

8. The method of claim 1, wherein the corrective action is blacklisting a caller who initiated the first telephone call.

9. The method of claim 1, wherein the corrective action is withholding a financial incentive from a caller or other party who is associated with the first telephone call.

10. The method of claim 1, wherein the corrective action is providing a notice to a system operator.

11. The method of claim 10, wherein the notice includes an indication of the probability that the first telephone call represents normal activity or fraudulent activity.

12. The method of claim 1, wherein the corrective action is storing an indication of the assessed probability of fraud to a log in non-volatile memory.

13. The method of claim 12, wherein the log includes the assessed probability of fraud, call characteristics associated with the first telephone call, an advertiser associated with the first telephone call, and/or a distribution channel associated with the first telephone call.

14. The method of claim 1, wherein the corrective action is not charging an advertiser for activity associated with the first telephone call.

15. The method of claim 1, wherein the assessed probability is expressed as a numerical percentage.

16. The method of claim 1, wherein a call recipient of the first telephone call is an Interactive Voice Response (IVR) system.

17. The method of claim 16, wherein an attempt by a caller to lengthen the amount of time that the caller interacts with the IVR constitutes a call characteristic that is indicative of fraudulent activity.

18. The method of claim 1, wherein the first and/or second sets of distributions of call characteristics are determined by a scoring function.

19. The method of claim 1, wherein at least one call characteristic is a distortion of a voice pattern.

20. A non-transitory computer-readable storage medium with instructions stored thereon that, when executed by a computing system, cause the computing system to perform a method to monitor telephone calls to detect fraudulent activity and take corrective action, the method comprising:
    receiving a first telephone call placed to a first published telephone number, wherein the first published telephone number is published via a distribution channel, and wherein a plurality of published telephone numbers that includes the first telephone number has been published via the distribution channel;
    analyzing the first telephone call to identify a first set of distributions of call characteristics associated with the first telephone call;
    assessing a probability that the first telephone call represents normal activity or fraudulent activity, wherein the assessing comprises comparing the first set of distributions of call characteristics to a second set of distributions of call characteristics identified by analyzing a group of telephone calls, and wherein the second set of distributions of call characteristics are indicative of normal activity or fraudulent activity; and
    executing a corrective action in response to determining that the probability that the first telephone call represents fraudulent activity exceeds a threshold, wherein the corrective action is executed with respect to the distribution channel such that (a) the first telephone call and (b) a subsequently received second telephone call to a second published telephone number in the plurality of published telephone numbers are subject to the corrective action.

21. The non-transitory computer-readable storage medium of claim 20, wherein the corrective action is flagging the distribution channel for heightened monitoring.

22. The non-transitory computer-readable storage medium of claim 20, wherein the corrective action is disabling call activity on the distribution channel.

23. The non-transitory computer-readable storage medium of claim 20, wherein the corrective action is withholding a financial incentive from a party associated with generating telephone calls via the distribution channel.

24. The non-transitory computer-readable storage medium of claim 20, wherein the corrective action is blacklisting a caller who initiated the first telephone call.

25. The non-transitory computer-readable storage medium of claim 20, wherein the corrective action is withholding a financial incentive from a caller or other party who is associated with the first telephone call.

26. The non-transitory computer-readable storage medium of claim 20, wherein the corrective action is providing a notice to a system operator.

27. The non-transitory computer-readable storage medium of claim 26, wherein the notice includes an indication of the probability that the first telephone call represents normal activity or fraudulent activity.

28. The non-transitory computer-readable storage medium of claim 20, wherein the corrective action is storing an indication of the assessed probability of fraud to a log in non-volatile memory.

29. The non-transitory computer-readable storage medium of claim 28, wherein the log includes the assessed probability of fraud, call characteristics associated with the first telephone call, an advertiser associated with the first telephone call, and/or a distribution channel associated with the first telephone call.

30. The non-transitory computer-readable storage medium of claim 20, wherein the corrective action is not charging an advertiser for activity associated with the first telephone call.

31. The non-transitory computer-readable storage medium of claim 20, wherein the assessed probability is expressed as a numerical percentage.

32. The non-transitory computer-readable storage medium of claim 20, wherein a call recipient of the first telephone call is an Interactive Voice Response (IVR) system.

33. The non-transitory computer-readable storage medium of claim 32, wherein an attempt by the caller to lengthen the amount of time that the caller interacts with the IVR constitutes a call characteristic that is indicative of fraudulent activity.

34. The non-transitory computer-readable storage medium of claim 20, wherein the first and/or second sets of distributions of call characteristics are determined by a scoring function.

35. The non-transitory computer-readable storage medium of claim 20, wherein at least one call characteristic is a distortion of a voice pattern.

36. The non-transitory computer-readable storage medium of claim 20, wherein analyzing the first telephone call to identify the first set of distributions of call characteristics associated with the first telephone call comprises analyzing a pattern of interaction between a caller and a call recipient of the first telephone call.

37. The non-transitory computer-readable storage medium of claim 20, wherein analyzing the first telephone call to identify the first set of distributions of call characteristics associated with the first telephone call is performed without using recording, transcription, or caller identification in connection with the analysis of the first telephone call.

38. The non-transitory computer-readable storage medium of claim 20, wherein:
    the group of telephone calls is a first group of telephone calls;
    the method further comprises assessing a probability that the first telephone call represents indeterminate activity;
    the assessing comprises comparing the first set of distributions of call characteristics to a third set of distributions of call characteristics identified by analyzing a second group of telephone calls; and
    the third set of distributions of call characteristics are indicative of indeterminate activity.

* * * * *